United States Patent [19]

DeGuiseppi et al.

[11] 4,237,238

[45] Dec. 2, 1980

[54] POLYISOCYANURATE FOAMS BASED ON ESTERIFIED DMI OXIDATION RESIDUE ADDITIVE

[75] Inventors: David T. DeGuiseppi, Wallingford; Richard A. Kolakowski, Northford, both of Conn.

[73] Assignee: The Upjohn Company, Kalamazoo, Mich.

[21] Appl. No.: 81,325

[22] Filed: Oct. 3, 1979

[51] Int. Cl.[3] ........................ C08G 18/24; C08G 18/42

[52] U.S. Cl. .................................... 521/131; 521/172; 521/173; 521/902

[58] Field of Search ................ 521/172, 173, 902, 131

[56] References Cited

U.S. PATENT DOCUMENTS

| | | | |
|---|---|---|---|
| 3,647,759 | 3/1972 | Walker | 528/296 |
| 4,039,487 | 8/1977 | Kolakowski | 521/172 |
| 4,048,104 | 9/1977 | Svoboda | 521/173 |
| 4,100,354 | 7/1978 | Owen | 521/172 |
| 4,184,022 | 1/1980 | Lawyer | 521/118 |

*Primary Examiner*—H. S. Cockeram
*Attorney, Agent, or Firm*—James S. Rose; Denis A. Firth

[57] ABSTRACT

Polyisocyanurate foams are disclosed which are characterized by a combination of a high degree of fire resistance with low smoke evolution, low foam friability yet high compressive strength, and, most unexpectedly, the formation of a protective intumescent char over unburnt foam when the foam is subjected to combustion. This combination of advantageous features is achieved by employing in the foam forming reaction a minor amount of a polyol mixture prepared by the transesterification, with a glycol of molecular weight from about 60 to about 400, of a residue obtained from the manufacture of dimethyl terephthalate.

7 Claims, No Drawings

POLYISOCYANURATE FOAMS BASED ON ESTERIFIED DMI OXIDATION RESIDUE ADDITIVE

BACKGROUND OF THE INVENTION

1. Field of the Invention

This invention relates to the preparation of polymer foams and is more particularly concerned with polyisocyanurate foams.

2. Description of the Prior Art

Cellular polymers in which the major recurring polymer unit is isocyanurate, are well known and widely used in the art; see for example U.S. Pat. Nos. 3,516,950, 3,625,872, 3,644,232, 3,676,380, 3,725,319, 3,745,133, 3,763,057, 3,793,236, 3,799,896, 3,849,349, 3,876,568, 3,891,579, 3,909,465, 4,025,469, 4,039,487, and 4,092,276. Generally speaking, the polyisocyanurate foams prepared in accordance with the prior art are found to be more fire resistant and show lower smoke evolution on burning, in comparison to polyurethane foams, when subjected to the various testing procedures known and used in the foam art. Polyisocyanurate foams tend to be brittle or friable and to overcome this deficiency the prior art teaches that various types of polyols added in varying amounts will lower foam friability. But this is not without its disadvantages because the fire and smoke properties of the polyisocyanurate foam deteriorate as the polyurethane content increases. Therefore a rather fine balance exists between the amount and type of polyol one adds to a polyisocyanurate foam formulation in order to maintain maximum flame and smoke resistance while at the same time reach an improvement in foam friability.

Polyester polyols of many types are well known as useful polyol additives in polyisocyanurate formulations; see the patents cited supra. Typically, U.S. Pat. No. 4,039,487 discloses the use of certain aromatic polyester polyols in particular proportions to prepare polyisocyanurate foams possessed of remarkably good fire resistance and low smoke evolution upon combustion in the absence of fire retardants or smoke inhibiting agents. However the friability of the foams obtained tends to be relatively high. Furthermore, the polyols are comparatively expensive to manufacture.

U.S. Pat. No. 4,092,276 discloses the use of certain aromatic polyester polyols in preparing polyisocyanurate foams possessed of good friability and good fire resistance but not very strong in compressive strength. The polyols disclosed therein, like the ones referred to above, require the use of expensive ingredients to manufacture.

A further problem which arises from the use of aromatic polyester polyols, particularly those of low molecular weight (which includes the ones referred to above), is the tendency for the polyols themselves to be solid at room temperature, or, at best, to be possessed of very high viscosity and poor solubility in resin mixtures, which properties makes them difficult to handle in resin formulations.

We have now found, quite unexpectedly, that polyisocyanurate foams prepared with a minor amount of a cheap, readily available, by-product type of polyol mixture are characterized by a high degree of fire resistance with low smoke evolution on combustion and a surprisingly low foam friability. Further, the polyol mixture is in liquid form and therefore handled easily. Combined with these advantageous properties are the improved compressive strengths of the foams of the present invention over those found in the prior art. Additionally, and most surprisingly, the instant foams upon combustion form a protective intumescent char over unburnt foam and show very low heat and smoke release when tested in accordance with the Smith test defined below. This combination of advantageous properties has not heretofore been disclosed in the art.

SUMMARY OF THE INVENTION

This invention comprises an improved cellular polymer in which the major recurring polymer unit is isocyanurate which polymer comprises the reaction product obtained by bringing together in the presence of a blowing agent, an organic polyisocyanate, a trimerization catalyst, and a minor amount of a polyol wherein the improvement comprises employing as the polyol component from about 0.1 hydroxyl equivalent to about 0.5 hydroxyl equivalent, per equivalent of said polyisocyanate, of a polyol mixture prepared by the transesterification, with a glycol of molecular weight from about 60 to about 400, of a residue remaining after dimethyl terephthalate and methyl p-toluate have been removed from a dimethyl terephthalate esterified oxidate reaction product the major portion of said residue comprising a mixture of methyl and benzyl esters of benzene and biphenyl di- and tricarboxylic acids.

The term "glycol" means an aliphatic dihydric alcohol having the molecular weight limitations set forth above and is inclusive of aliphatic diols having from 2 to 6 carbon atoms such as ethylene, oxydiethylene, propylene, oxydipropylene, butylene, pentylene, and hexylene glycols, and isomeric forms thereof; and the polyoxyalkylene glycols such as polyoxyethylene and polyoxypropylene glycols having a molecular weight from about 150 to about 400.

The term "residue" defined above refers to the purged residue which is obtained during the manufacture of dimethyl terephthalate in which p-xylene is oxidized and the crude oxidation product is then esterified with methanol to yield the desired product in a reaction mixture along with a complex mixture of by-products. Generally speaking, the desired product (dimethyl terephthalate) is removed from the reaction mixture with the volatile methyl p-toluate by-product by distillation leaving a residue. The dimethyl terephthalate and methyl p-toluate are separated. Some of the residue is purged from the process while the remainder of the residue and the methyl p-toluate are recycled for oxidation. It is this purged residue which is transesterified with glycols to yield useful polyhydric reaction products.

U.S. Pat. No. 3,647,759 describes in detail the residue set forth above and characterizes its properties. The reference further describes in detail the transesterification procedure using ethylene glycol. The disclosure and teaching of the above patent are incorporated by reference herein in their entirety, and, particularly, in reference to the preparation of liquid polyol mixtures by using an excess of the transesterifying glycol (see column 3, lines 8 to 11 and lines 18 to 20 of said patent).

The polyisocyanurate cellular polymers in accordance with the present invention are useful in the manufacture of foam bun stock material, pour-in-place foams, laminate foam sandwich materials, and spray foams. The above foams find particular utility in building construction as thermal insulating materials and also in the field of sound insulation.

DETAILED DESCRIPTION OF THE INVENTION

The novelty of the present invention resides in the incorporation of advantageously from about 0.1 to about 0.5, and preferably from about 0.15 to about 0.25, hydroxyl equivalents of the transesterified polyol mixture defined above per equivalent of polyisocyanate in a polyisocyanurate foam formulation mixture.

It will be obvious to one skilled in the art that included within the hydroxyl equivalent ranges set forth above is the complex mixture of aromatic polyester polyol constituents defined in U.S. Pat. No. 3,647,759. Also included within the scope of these ranges are the hydroxyl equivalents contributed by the presence of any optional excess esterifying glycol that may be present in the polyol mixture.

In a further embodiment in accordance with the present invention, additional hydroxyl containing components may be added in minor amounts particularly as diluents or viscosity modifiers for the aromatic polyester polyol mixture. While the subject of diluents will be discussed in detail hereinbelow, it is to be understood that any minor amount of hydroxyl equivalents arising from the optional use of hydroxyl containing diluents is included within the ranges set forth above.

The transesterified polyol mixture is prepared by heating the residue defined above with the transesterifying glycol in accordance with the procedures described in U.S. Pat. No. 3,647,759 incorporated by reference herein. The residue contains a complex mixture comprising primarily the methyl and benzyl esters of benzene di- and tricarboxylic acids and biphenyl di- and tricarboxylic acids, along with the possible presence of minor amounts of carbomethoxy derivatives of substituted fluorenone, and benzocoumarins, and minor amounts of monofunctional derivatives. This complex mixture forms during the oxidation and methyl esterification steps for producing dimethyl terephthalate from p-xylene. For a typical description of a composition of a residue in accordance with U.S. Pat. No. 3,647,759 see Bulletin SD-11, 1971, page 3 entitled Synthetics K23 Polar Aromatic Resin published by Hercules, Inc., Wilmington, Del.

The transesterifying step is simply the replacement of the non-hydroxyl containing carbomethoxy groups in the various aromatic esters of the residue by the glycol agents so that the ester groups now contain, for the most part, terminal hydroxyl groups.

Illustrative of the esterifying glycols which can be employed in accordance with the above process are ethylene glycol, 1,3-propylene glycol, 1,2-propylene glycol, 1,4-butanediol, 1,2-hexanediol, 1,6-hexanediol, diethylene glycol, dipropylene glycol, tripropylene glycol, the polyoxyethylene glycols, and polypropylene glycols falling within the molecular weight limitations set forth above.

A preferred group of glycols consists of ethylene glycol and diethylene glycol with the latter being most preferred.

Examples of ethylene glycol and diethylene glycol transesterified residues which are used in accordance with the present invention are those produced commercially under the tradename of Terate® resins and supplied by Hercules Inc., Wilmington, Del. (see Hercules Bulletin OR-242 Terate®101 and 303 Resins and Bulletin OR-245 Terate®200 Series Resin Polyols).

The properties of the transesterified polyol mixtures which are employed in accordance with the present invention fall within rather broad ranges because of the complexity and the variation of the dimethyl terephthalate esterified oxidate residues themselves. The latter residues are subject to content variation according to the conditions employed in the oxidation steps used with the p-xylene, etc.

Accordingly, the viscosities of the polyol mixtures measured in cps at 25° C. fall within a range of about 1000 to about 500,000, preferably about 1500 to about 100,000 and most preferably about 4,000 to about 50,000; the hydroxyl number values fall within a range of from about 15 to about 750, preferably about 30 to about 550, and most preferably from about 100 to about 550; the acid number falls within a range of from about 2 to about 40 and preferably about 2 to about 10.

The amount of the optional but preferred excess of transesterifying glycol remaining in the polyol mixture can vary broadly but advantageously falls within a range of from about 5 to about 30 percent by weight of the polyol mixture.

A most preferred polyol mixture employed in accordance with the present invention is characterized by a viscosity in cps at 25° C. of about 8,000 to about 30,000, a free diethylene glycol content of from about 5 to about 10 percent by weight of said mixture, a hydroxyl number within a range of from about 247 to about 363, and an acid number of about 2 to about 8.

It will be understood by those skilled in the art that polyol viscosity sometimes requires adjustment or modification in order to balance component pumping ratios or to satisfy some other processing requirement. Although the polyol mixtures employed in accordance with the present invention can be readily produced as fluid materials, particularly by employing excess glycol transesterifying agent and leaving residual glycol in the resin, it is within the scope of the present invention to employ additional diluents with the polyol mixtures.

Inert diluents can be employed but it is usually preferred to employ liquid polyols. Therefore, in a further and preferred embodiment of the present invention, diols such as ethylene glycol, diethylene glycol, dipropylene glycol, or any of the glycols set forth above as the transesterifying agents may be added in a later step to reduce the viscosity of the polyol mixture.

The diluents are employed in only minor amounts within a range of from about 1 to about 20 percent by weight, preferably 5 to about 15 percent by weight of the polyol mixture.

In carrying out the preparation of the polyisocyanurate foams in accordance with the present invention, the procedures and equipment conventional in the art are employed; see for example the U.S. patents cited supra whose disclosures with respect to the preparation of polyisocyanurate foams are incorporated by reference herein.

The organic polyisocyanates which can be trimerized to the polyisocyanurate resins in accordance with the present invention can be any of the aromatic polyisocyanates conventionally employed in the art for this purpose previously; see the U.S. patents cited supra and the teachings of the incorporated references. Advantageously, and in order to obtain resins or foams having exceptionally high heat resistance and structural strength, the preferred polyisocyanates are the polymethylene polyphenylisocyanates, and particularly preferred are those polyisocyanate mixtures which contain from about 30 to about 85 percent by weight of methylenebis(phenyl isocyanate), the remainder of said mixture comprising polymethylene polyphenyl polyisocyanates of functionality higher than 2.0.

The trimerization catalyst employed can be any catalyst known to those skilled in the art which will catalyze the trimerization of an organic isocyanate compound to form the isocyanurate moiety. For typical isocyanate trimerization catalysts see The Journal of Cellular Plastics, November/December 1975, page 329; U.S. Pat. Nos. 3,745,133, 3,896,052, 3,899,443, 3,903,018, 3,954,684, and 4,101,465, the disclosures of these references being hereby incorporated by reference herein.

Typical catalyst classes are the glycine salts and tertiary amine trimerization catalysts and alkali metal carboxylic acid salts disclosed in the above patents and mixtures of the various types of catalysts. Preferred species within the classes are sodium N-(2-hydroxy-5-nonylphenyl)methyl-N-methylglycinate, and N,N-dimethylcyclohexylamine, and mixtures thereof. Also included in the preferred catalyst components are the epoxides disclosed in U.S. Pat. No. 3,745,133.

The total quantity of catalyst, including mixtures of catalysts, in parts by weight per equivalent of polyisocyanate, can be determined easily by trial and error for any formulation in accordance with the present invention. Advantageously, the catalyst is employed within a range of about 0.1 parts to about 20 parts by weight per equivalent of polyisocyanate, preferably, from about 0.5 parts to about 10 parts.

Foaming agents, and other optional additives such as dispersing agents, cell stabilizers, surfactants, flame retardants, and the like, can be employed according to the teachings of the incorporated references. A preferred class of flame retardant additives is the phosphorus containing flame retardants such as tris(2-chloroethyl)phosphate, tris(2-chloropropyl)phosphate, tris(2,3-dibromopropyl)phosphate, tris(1,3-dichloroisopropyl)phosphate, and the like.

The foaming agents employed can be any of the volatile solvents usually employed in the preparation of cellular plastics such as the lower molecular weight halogenated aliphatic hydrocarbons and water; see U.S. Pat. No. 3,745,133, column 11, lines 21 to 45 inclusive for more detailed teaching on blowing agents. Preferred are the fluorocarbon blowing agents.

The use of the aromatic polyester polyol mixtures in accordance with the present invention provides polyisocyanurate foams possessed of all of the advantageous features already disclosed in the prior art for aromatic polyester polyols (see patents cited supra), and, additionally, possessed of a surprising combination of high compressive strength with very low friability. Generally speaking, in the preparation of polyisocyanurate foams this combination is difficult to obtain.

Further, and most surprising, is the formation of a protective layer of intumescent char on unburnt material when the foams are exposed to fire.

In this connection, foam samples prepared in accordance with the present invention and tested in accordance with the Smith test (see Example 1, Footnote 9) procedure, displayed low rates of heat and smoke release with low weight loss and the formation of a good strong intumescent char layer on the unburnt foam. The Smith test measures the rate at which heat and smoke is released from a burning sample measuring 9⅞ inches square by 2 inches thick under the test conditions.

The following examples describe the manner and process of making and using the invention and set forth the best mode contemplated by the inventors of carrying out the invention but are not to be construed as limiting.

EXAMPLE 1

This example sets forth a polyisocyanurate foam bunstock prepared in accordance with the present invention. The foam was prepared using a foam metering and dispensing modulating unit equipped with a pin type impeller rotating at 3200 r.p.m. (Admiral Equipment Corporation, Akron, Ohio a division of The Upjohn Company, Kalamazoo, Mich.) and adapted to mix five components prepared from the ingredients in the proportions by weight set forth in Table I. The foam forming mixture was dispensed on a 4' wide conveyor lined with #40 Kraft paper with the conveyor angle set at 5.3° and moving at 10 feet per minute.

The foam obtained was characterized by low flame spread and low smoke evolution, with an intumescent type char formation, excellent friability and compressive strength, and high conversion to trimer. Further, it showed a low rate of heat and smoke release as evidenced by the data set forth in Table I.

TABLE I

| Foam | A |
|---|---|
| Ingredients (pts. by wt.) | |
| Component A (at 65–70° F.): | |
| Polyisocyanate I[1] | 134 |
| L-5340[2] | 1 |
| Component B (at 55–60° F.): | |
| Terate ® 202-25[3] | 24.0 (0.2 eq.) |
| DC-193[4] | 0.7 |
| Component C (at 72–80° F.): | |
| DER-331[5] | 2.0 |
| Monofluorotrichloromethane | 0.5 |
| Component D (72–80° F.): | |
| Catalyst I[6] | 3.0 |
| Component E (55–60° F.): | |
| Monofluorotrichloromethane | 22.0 |
| Rise characteristics (in 14" square test box) | |
| cream, sec. | 19 |
| initiation, sec. | 22 |
| gel, sec. | 87 |
| rise, min. | 2 |
| firm, min. | 5 |
| Max. exotherm | 310° F. |
| Density (p.c.f.) | 2.0 |
| Compressive str., psi | |
| ‖ to rise | 35.7 |
| ⊥ down conveyor | 19.1 |
| ⊥ across conveyor | 23.0 |
| Friability (% wt. loss)[7] | 30.4 |
| 300° F. Dry Age Δ Vol.(%) | |
| 7 days | 3.7% |
| % Trimer content[8] | 33.9% |
| ASTM E-84 Test on 3" thick sample: | |
| FSR | 23.1 |
| Smoke generated | 185 |
| Smith Release Data[9] | |
| Max. rate of heat release (RHR) (in BTU/min.,ft.$^2$) | 111 |
| Cumulated heat release (CHR) (BTU/ft.$^2$ over 3 mins.) | 92 |
| Heat release/gm. wt. loss (HR/gm. wt. loss) | 3.7 |
| Max. rate of smoke release (RSR) (in particles/min. ft.$^2$) | 5056 |
| Cumulated smoke release (CSR) (particles/ft.$^2$ over 3 mins.) | 942 |
| Smoke release/gm. wt. loss (SR/gm. wt. loss) | 37.5 |

TABLE I-continued

| Foam | A |
|---|---|
| % wt. loss | 14.1 |
| Char swell | 15% |

Footnotes to TABLE I

[1]Polyisocyanate I is a blend of 65 parts of a polymethylene poly(phenyl isocyanate) mixture containing about 35 percent by weight of methylenebis(phenyl isocyanate) with the balance of about 65 percent being polymethylene poly(phenyl isocyanates) having a functionality higher than 2, with 35 parts of a polymethylene poly(phenyl isocyanate) mixture containing about 30 percent by weight of methylenebis(phenyl isocyanate) the balance having a functionality higher than 2 and treated with a minor amount of monomeric epoxide in accordance with U.S. Pat. No. 3,793,362; I.E. of the blend = 137-144, visc.(cps./25° C.) = 800-1000.

[2]L-5340: Union Carbide Silicone Surfactant for Rigid Urethane Foam, see bulletin F-42172A, October, 1970, viscosity of 1,000 cstk. at 25° C.

[3]Terate ® 202-25 is the aromatic polyester polyol mixture derived from the transesterification of a mixture of polycarbomethoxy substituted benzenes, diphenyls, polyphenyls, and benzyl esters of the toluate family with diethylene glycol; viscosity (cps./25° C.) = 1650; hydroxyl number = 452. OH eq. wt. = 124; acid number = 3; moisture % maximum = 0.083; see Bulletin OR-245, 1972 entitled "Terate ® 200 Series Resin Polyols for Rigid and Semirigid Polyurethane Foams," Hercules Inc., Wilmington, Del.

[4]DC-193: A silicone surfactant sold by Dow Corning Corp.; see "Dow Corning 193 Surfactant," Bulletin: 05-146, Feb., 1966.

[5]DER-331 is a bisphenol-A/epichlorohydrin epoxy resin; visc. (cps. at 25° C.) = 11,000-14,000; epoxide eq. wt. = 182-188, supplied by The Dow Chemical Company, Midland, Mich.

[6]Catalyst I is a mixture in the proportions by weight of (1) 9 parts of a 50% w/w solution of sodium N-(2-hydroxy-5-nonylphenyl)methyl-N-methylglycinate in diethylene glycol (2) 1 part of N,N-dimethylcyclohexylamine, and (3) 1 part of diethylene glycol.

[7]Friability is the percent sample weight loss over a 10 minute period and determined in accordance with ASTM Test method C-421.

[8]$\% \text{ Trimer Content} = \frac{R - .48}{2.22 - 0.481} \times 100$ and represents the percentage of isocyanate equivalents converted to trimer per equivalent of isocyanate; R is the ratio of the trimer absorption peak at 1410 $cm^{-1}$ to the aromatic reference peak at 1510 $cm^{-1}$.

[9]Smith Release Data refers to the measurements of the rate of heat and smoke release from a burning sample of material measuring 9¼ inches square by 2 inches thick in a test chamber along with the cumulated heat and smoke release over a standard period of 3 minutes and the percent weight loss of the sample from combustion and swell of the char as a percentage of the total sample volume; said measurements being carried out in accordance with the method and apparatus described by E. E. Smith Journal of Fire Technology (3), page 157; 1973.

EXAMPLE 2

The following four polyisocyanurate hand-mix foams (B through E) were prepared in accordance with the present invention. The components, consisting of the ingredients in the proportions by weight set forth in Table II below, were thoroughly mixed for a standard 10 second period in a plastic 1 gallon tub using a high speed drill press motor (1720 r.p.m.) using a Conn agitator. The resin mixture was rapidly poured into a cardboard box measuring 14 inches × 14 inches and the resulting foam allowed to rise freely.

All of the foams were formulated to have approximately the same gel times (about 1 minute and 30 seconds). The various Terate ® polyester mixtures formed foams having similar rise profiles. The higher viscosity polyester polyols (Foams D & E) required higher catalyst levels to achieve rise profiles comparable to Foams B and C.

The Smith smoke and heat release data were excellent for all four foams with their resultant char formations showing extreme swelling and intumescence. This intumescence and char was on the foam surface which formed a protective insulating layer for the unburnt foam underneath. This data is reported in Table II as percent swell.

TABLE II

| Foam | B | C | D | E |
|---|---|---|---|---|
| Ingredients (pts. by wt.) | | | | |
| Component A: | | | | |
| Polyisocyanate II[1] | 134 | 134 | 134 | 134 |
| L-5340 | 1 | 1 | 1 | 1 |
| DER-331 | 2 | 2 | 2 | 2 |
| Monofluorotrichloromethane | 23.6 | 13.6 | 15.5 | 13.8 |
| Component B: | | | | |
| Terate ® 202-25[2] | 24.8 (0.2 eq.) | | | |
| Terate ® 202-40[3] | | 24.8 (0.2 eq.) | | |
| Terate ® 203-300[4] | | | 35.4 (0.2 eq.) | |
| Terate ® 203-240[5] | | | | 24.8 (0.13 eq.) |
| DC-193 | 0.7 | 0.7 | 0.7 | 0.7 |
| Catalyst II[6] | — | 2.5 | 4.7 | 6.0 |
| N,N-dimethylcyclohexylamine | — | 0.3 | 0.3 | 0.3 |
| Monofluorotrichloromethane | — | 10.0 | 10.0 | 10.0 |
| Component C: | | | | |
| Catalyst I[7] | 2.2 | — | — | — |
| Rise characteristics (mins.:secs.) | | | | |
| cream | :21 | :20 | :17 | :16 |
| initiation | :25 | :22 | :19 | :19 |
| first rise | :58 | 1:00 | :50 | :52 |
| second initiation | 1:25 | 1:20 | 1:20 | 1:30 |
| gel | 1:33 | 1:30 | 1:25 | 1:40 |
| Rise | 2:05 | 2:00 | 1:55 | 2:30 |
| firm | 4:15 | 4:15 | 3:30 | 3:45 |
| tack free | 2:45 | 2:45 | 1:55 | 3:45 |
| Max. exotherm (°F.) | 292 | 287 | 285 | 280 |
| Density (pcf) | 2.00 | 1.85 | 2.00 | 1.99 |
| Friability | 12% | 20% | 3% | 12% |
| % Trimer | 32.9 | 26.2 | 29.5 | 27.4 |
| Smith Release Data | | | | |
| Max. RHR | 116.2 | 125.7 | 101.5 | 88.1 |

TABLE II-continued

| Foam | B | C | D | E |
|---|---|---|---|---|
| (in BTU/min.,ft.$^2$) | | | | |
| Cumulated HR | 89.6 | 114.8 | 72.6 | 72.7 |
| (BTU/ft.$^2$ over 3 mins.) | | | | |
| HR/gm. wt. loss | 2.8 | 4.0 | 2.9 | 2.7 |
| Max. RSR | 3365 | 3702 | 2608 | 3090.7 |
| (in particles/min.,ft.$^2$) | | | | |
| Cumulated SR | 632.7 | 723.8 | 515.5 | 684.8 |
| (particles/ft.$^2$ | | | | |
| over 3 min.) | | | | |
| SR/gm. wt. loss | 19.9 | 25.0 | 20.7 | 25.3 |
| % wt. loss | 17.1 | 17.3 | 13.8 | 15.0 |
| Char swell | 30% | 40% | 55% | 50% |

[1]Polyisocyanate II is a polymethylene poly(phenyl isocyanate) mixture containing about 35 percent by weight of methylene-bis(phenyl isocyanate) with the balance of about 65 percent being polymethylene poly(phenyl isocyanates) having a functionality higher than 2 which mixture has been heat treated at a temperature of from about 380° to about 440° F. while passing nitrogen through it; I.E. = about 140.
[2]Terate® 202-25 is defined in footnote 3 of Table I above.
[3]Terate® 202-40 is similar to the Terate® 202-25 above having a hydroxyl number of 452; a visc. (cps./25° C. = 1550; and acid number = 4; see bulletin cited supra in footnote 3 of Table I.
[4]Terate® 203-300 differs from the above Terates® in having a lower hydroxyl number of 315; and a higher visc. (cps./25° C.) = 21,600; and acid # = 5.1; see bulletin cited supra in footnote 3 of Table I.
[5]Terate® 203-240 differs from the other Terates® in having the lowest hydroxy number of 298; and highest visc. (cps/25° C.) = 30,000; acid # = 4.2; see bulletin cited supra in footnote 3 of Table I.
[6]Catalyst II is a 50% w/w solution of sodium N-(2-hydroxy-5-nonylphenyl)methyl-N-methylglycinate in diethylene glycol.
[7]Catalyst I is defined in footnote 6 of Table I.

EXAMPLE 3

The following polyisocyanurate foam F was prepared in accordance with the present invention using the procedure and apparatus set forth in Example 1 except that four component mixing was employed and the ingredients in the proportions by weight set forth in Table III below.

TABLE III

| Foam | F | |
|---|---|---|
| Ingredients (pts. by wt.) | | |
| Component A (65-70° F.) | | |
| Polyisocyanate I | 134 | |
| L-5340 | 1 | |
| Monofluorotrichloromethane | 20 | |
| Component B (60-65° F.) | | |
| Terate® 203-300[1] | 22.9 | } 0.167 eq. |
| Diethylene glycol[1] | 2.1 | } |
| DC-193 | 0.7 | |
| Monofluorotrichloromethane | 3.5 | |
| Component C (72-80° F.) | | |
| DER-331 | 2.0 | |
| Monofluorotrichloromethane | 0.5 | |
| Component D (72-80° F.) | | |
| Catalyst III[2] | 3.75 | |
| Rise characteristics | | |
| (in 14" square test box) | | |
| cream, sec. | 11 | |
| initiation, sec. | 19 | |
| gel, sec. | 90 | |
| rise, min. | 2 | |
| firm, min. | 7 | |
| Max. exotherm | 300° F. | |
| Density (pcf) | 2.0 | |
| Compressive str., psi | | |
| ‖ to rise | 35.4 | |
| ⊥ down conveyor | 20.6 | |
| ⊥ across conveyor | 21.4 | |
| Friability (% wt. loss) | 24% | |
| 300° F. Dry Age Δ Vol. (%) | | |
| 7 days | 4.8% | |
| % Trimer content | 36.4 | |
| aASTM E-84 Test on 3" thick sample: | | |
| FSR | 23.1 | |
| Smoke generated | 178 | |
| Smith Release Data | | |
| Max. RHR | 138.6 | |
| a( in BTU/min.ft.$^2$) | | |
| CHR | 152.6 | |
| (BTU/ft.$^2$ over 3 mins.) | | |

TABLE III-continued

| Foam | F |
|---|---|
| HR/gm. wt. loss | 5.8 |
| Max. RSR | 4900 |
| (in particles/min/ft.$^2$) | |
| CSR | 956 |
| (particles/ft.$^2$ over 3 min.) | |
| SR/gm. wt. loss | 36.2 |
| % wt. loss | 15.1 |
| Char swell | 10% |

[1]This batch is Terate® 203-300 had the following assay; viscosity (cps/25° C.) = 19,000; a free diethylene glycol content of 8,7% by weight; OH equiv. wt. = 181; acid # = 6.0; and moisture content of 0.28% by wt.; the 22.9 parts of the Terate® 203-300 was blended with the 2.1 parts of extra diethylene glycol to yield a combined mixture in the ercent proportions by wt. of 91.6 and 8.4 respectively and a total hydroxy equivalent of 0.167.
[2]Catalyst III is a mixture in the proportions by weight of (1) 9 parts of a 50% w/w solution of sodium N-(2-hydroxy-5-nonylphenyl)methyl-N-methylglycinate in diethylene glycol, (2) 0.5 part of N,N-dimethylcyclohexylamine, and (3) 2 parts of diethylene glycol.

We claim:

1. In a cellular polymer in which the major recurring polymer unit is isocyanurate which polymer comprises the reaction product obtained by bringing together in the presence of a blowing agent, an organic polyisocyanate, a trimerization catalyst and a minor amount of a polyol the improvement which comprises employing as the polyol component from about 0.1 hydroxyl equivalent to about 0.5 hydroxyl equivalent per equivalent of said polyisocyanate of a polyol mixture prepared by the transesterification, with a glycol of molecular weight from about 60 to about 400, of a residue remaining after dimethyl terephthalate and methyl p-toluate have been removed from a dimethyl terephthalate esterified oxidate reaction product the major portion of said residue comprising a mixture of methyl and benzyl esters of benzene and biphenyl di- and tricarboxylic acids.

2. A cellular polymer according to claim 1 wherein said organic polyisocyanate is a polymethylene poly(-phenyl isocyanate).

3. A cellular polymer according to claim 1 wherein said esterifying glycol is ethylene glycol or diethylene glycol.

4. A cellular polymer in which the major recurring polymer unit is isocyanurate which polymer comprises the reaction product obtained by bringing together under foam forming conditions:

A. a polymethylene poly(phenyl isocyanate);

B. a fluorocarbon blowing agent

C. an isocyanate trimerization catalyst; and

D. from about 0.1 to about 0.5 equivalent, per equivalent of said polymethylene poly(phenyl isocyanate), of a polyol mixture prepared by the transesterification with ethylene glycol or diethylene glycol of a residue remaining after dimethyl terephthalate and methyl p-toluate have been removed from a dimethyl terephthalate esterified oxidate reaction product the major portion of said residue comprising a mixture of methyl and benzyl esters of benzene and biphenyl di- and tricarboxylic acids.

5. A cellular polymer according to claim 4 wherein diethylene glycol is the transesterification glycol.

6. A cellular polymer according to claim 5 wherein said polyol mixture (D) is characterized by a viscosity in cps at 25° C. of about 8,000 to about 30,000, a free diethylene glycol content of from about 5 to about 10 percent by weight of said mixture, a hydroxyl number within a range of from about 247 to about 363, and an acid number of about 2 to about 8.

7. A cellular polymer according to claim 6 wherein said polyol mixture (D) is comprised of:

(1) from about 80 to about 99 percent by weight of said polyol mixture defined in claim 6; and (2) from about 20 to about 1 percent by weight of diethylene glycol said about 20 to about 1 percent being additional to that diethylene glycol already present in (1).

* * * * *

Disclaimer 4,237,238.—*David T. De Gutseppi,* Wallingford, and *Richard A. Kolakowski,* Northford, Conn. POLYISOCYANURATE FOAMS BASED ON ESTERIFIED DMI OXIDATION RESIDUE ADDITIVE. Patent dated Dec. 2, 1980. Disclaimer filed June 28, 1982, by the assignee, *The Upjohn Co.*

Hereby enters this disclaimer to claims 1 through 7 inclusive of said patent.

[*Official Gazette August 24, 1982.*]